United States Patent
Yarkosky

(10) Patent No.: US 7,769,073 B2
(45) Date of Patent: *Aug. 3, 2010

(54) METHOD AND SYSTEM USING OVERLAPPING FREQUENCY BANDS IN A HYBRID FREQUENCY REUSE PLAN

(75) Inventor: Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 847 days.

This patent is subject to a terminal disclaimer.

(21) Appl. No.: 11/516,891

(22) Filed: Sep. 7, 2006

(65) Prior Publication Data

US 2007/0298807 A1 Dec. 27, 2007

Related U.S. Application Data

(63) Continuation-in-part of application No. 10/138,203, filed on May 3, 2002, now Pat. No. 7,555,028.

(51) Int. Cl.
*H04B 1/00* (2006.01)
(52) U.S. Cl. .................. 375/130; 455/507; 455/509; 455/516
(58) Field of Classification Search .................. 375/130; 455/507, 509, 516
See application file for complete search history.

(56) References Cited

U.S. PATENT DOCUMENTS

| 5,936,950 | A |   | 8/1999 | Hottinen |
| 5,943,330 | A | * | 8/1999 | Hottinen ..................... 370/335 |
| 6,088,341 | A |   | 7/2000 | Hinedi et al. |
| 6,101,176 | A |   | 8/2000 | Honkasalo et al. |
| 6,104,746 | A |   | 8/2000 | Ishikawa et al. |
| 6,130,886 | A |   | 10/2000 | Ketseoglou et al. |
| 6,381,461 | B1 |   | 4/2002 | Besson et al. |
| 6,704,546 | B1 | * | 3/2004 | Lucidarme et al. ............ 455/62 |

(Continued)

FOREIGN PATENT DOCUMENTS

EP 1566982 A2 8/2005

(Continued)

OTHER PUBLICATIONS

International Search Report and Written Opinion from related International application No. PCT/US2007/077738, mailed Feb. 20, 2008.

(Continued)

*Primary Examiner*—Juan A Torres

(57) ABSTRACT

The wireless coverage of a wireless telecommunications network is divided into a plurality of cells, and each cell is further divided into an alpha sector, a beta sector, and a gamma sector. The alpha sectors are provided with a first frequency assignment that includes a first frequency band and a second frequency band. The beta sectors are provided with a second frequency assignment that includes the first frequency band and a third frequency band. The gamma sectors are provided with a third frequency assignment that includes the first frequency band and a fourth frequency band. The second and third frequency bands partially overlap in frequency. The third and fourth frequency bands also partially overlap in frequency. By using overlapping frequency bands, the benefits of hybrid frequency reuse may be achieved in a more spectrally efficient manner.

19 Claims, 3 Drawing Sheets

U.S. PATENT DOCUMENTS

| | | | |
|---|---|---|---|
| 6,771,963 B1 | 8/2004 | Cheng et al. | |
| 6,781,974 B1 | 8/2004 | Tsumura | |
| 6,792,276 B1 | 9/2004 | Butovitsch et al. | |
| 6,891,816 B2* | 5/2005 | Smith et al. | 370/335 |
| 7,062,268 B2 | 6/2006 | McKenna | |
| 7,260,416 B2* | 8/2007 | Shippee | 455/552.1 |
| 2002/0085618 A1* | 7/2002 | Vanderpool | 375/130 |
| 2002/0173272 A1 | 11/2002 | Liang et al. | |
| 2002/0176386 A1 | 11/2002 | Singh | |
| 2003/0096574 A1 | 5/2003 | Anderson et al. | |
| 2003/0162545 A1 | 8/2003 | Csapo et al. | |
| 2004/0125772 A9 | 7/2004 | Wu et al. | |
| 2004/0147243 A1 | 7/2004 | McKenna | |
| 2005/0059401 A1 | 3/2005 | Chen et al. | |
| 2006/0052123 A1 | 3/2006 | Youngil Ha et al. | |
| 2006/0194576 A1 | 8/2006 | Karabinis et al. | |
| 2007/0173202 A1* | 7/2007 | Binder et al. | 455/68 |
| 2007/0242769 A1 | 10/2007 | Yang | |

FOREIGN PATENT DOCUMENTS

| | | |
|---|---|---|
| EP | 1811699 A1 | 7/2007 |
| WO | 97/15985 A1 | 5/1997 |
| WO | 2006/058491 A1 | 6/2006 |

OTHER PUBLICATIONS

International Preliminary Report on Patentability, dated Mar. 10, 2009, from related International Application No. PCT/US2007/077738.

3rd Generation Partnership Project 2, "cdma High Rate Packet Data Air Interface Specfication," 3GPP2 C.S0024-B, v. 1.0 (Apr. 2006).

Motorola, "CDMA 2000 EV-DO Revision B", Briefing Paper, May 2006.

* cited by examiner

METHOD AND SYSTEM USING OVERLAPPING FREQUENCY BANDS IN A HYBRID FREQUENCY REUSE PLAN

CROSS-REFERENCE TO RELATED APPLICATIONS

This application is a continuation-in-part of U.S. application Ser. No. 10/138,203, filed May 3, 2002, which is incorporated herein by reference.

BACKGROUND

1. Field of the Invention

The present invention relates to wireless telecommunications and, more particularly, to a method and system that uses overlapping frequency bands in a hybrid frequency reuse plan for a wireless telecommunications network.

2. Description of Related Art

There has been an increased interest in providing wireless telecommunications networks that support high rate packet data communications. In the area of spread spectrum wireless communications, EVDO (Evolution Data Optimized) has been developed as a way of providing high speed data communications in cdma2000 networks. In the EVDO approach, a combination of code division multiple access (CDMA) and time division multiple access (TDMA) is used for downlink communications, i.e., communications from the base station to the mobile station (the forward link), and CDMA is used for uplink communications, i.e., communications from the mobile station to the base station (the reverse link). Different modulation schemes can be used for downlink and uplink communications, depending on signal-to-noise ratios. In this way, higher signal-to-noise ratios can support modulation schemes that support higher data rates.

As described in the original specification, EVDO was a frequency division duplex (FDD) approach, with one 1.25 MHz frequency band (e.g., a CDMA frequency channel) used for downlink communications and a separate 1.25 MHz frequency band (e.g., another CDMA frequency channel) used for uplink communications. Moreover, these frequency bands were reused in a K=1 frequency reuse plan. Thus, the same 1.25 MHz downlink frequency band and the same 1.25 MHz uplink frequency band were reused in adjacent cells and sectors through the use of different pseudonoise (PN) code offsets. The original EVDO approach could support a peak downlink data rate of 2.4 Mbps and a peak uplink data rate of 153.6 kbps. Revision A of EVDO enabled even higher downlink and uplink data rates.

Revision B of EVDO, however, includes some significant changes in the area of frequency usage. Revision B is described in $3^{rd}$ Generation Partnership Project 2, "cdma2000 High Rate Packet Data Air Interface Specification," 3GPP2 C.S0024-B, v1.0 (May 2006), which is incorporated herein by reference. As one significant change, Revision B provides for channel concatenation, in which multiple 1.25 MHz downlink frequency bands and/or multiple 1.25 MHz uplink frequency bands are used together for communications. Such channel concatenation can be used to achieve higher data rates. In addition, Revision B supports "hybrid frequency reuse," in which different downlink and/or uplink frequency bands are reused among multiple cells or sectors in different ways.

One type of hybrid frequency reuse that has been proposed for Revision B is a K=1/K=3 approach that uses four carrier frequencies that are spread spectrum modulated so as to provide four frequency bands for the downlink (the uplink may be K=1). One of the frequency bands is reused among all of the sectors in a given area, whereas each of three other frequency bands are reused among only certain of the sectors. This K=1/K=3 approach is illustrated in FIGS. 1 and 2.

As shown in FIG. 1, the four frequency bands may be sequential 1.25 MHz CDMA frequency bands, which are identified in FIG. 1 as F1, F2, F3, and F4. The F1 frequency band may be used in all sectors. However, the F2 frequency band may be used in only "alpha" sectors, the F3 frequency band may be used in only "beta" sectors, and the F4 frequency band may be used in only "gamma" sectors. Conventionally, each cell includes one "alpha" sector, one "beta" sector, and one "gamma" sector, which may be arranged as illustrated schematically in FIG. 2. Within each sector, two frequency bands may be concatenated for greater throughput. Thus, F1 and F2 may be concatenated in alpha sectors, F1 and F3 may be concatenated in beta sectors, and F1 and F4 may be concatenated in gamma sectors.

By having one frequency band (F1) common to all of the sectors, soft handoffs between sectors can be facilitated for the reverse link and fast cell site selection can be facilitated for the forward link. However, by also using different carrier frequencies in different sectors, higher data rates and sector throughputs can be supported. In particular, as a mobile station using two frequency bands moves toward the edge of a cell, the mobile station will encounter signals from an adjacent sector in an adjacent cell. The signals from the adjacent sector will include signals in one of same frequency bands used by the mobile station (i.e., from F1, which is common to all of the sectors). However, the mobile station will also be using a frequency band that is not used in the adjacent sector. For example, when a mobile station in a beta sector (using F1 and F3) moves to the cell edge, it will encounter signals from either an alpha sector (using F1 and F2) or a gamma sector (using F1 and F4). In either case, one of the frequency bands used by the mobile station will be non-interfering with the signals from the adjacent sector. This leads to a higher signal-to-noise ratio at the cell edge, which means that higher data rates can be supported at the cell edge. The overall result is that higher average data rates and sector throughputs can be supported throughout the cell.

Although this approach for hybrid frequency reuse can provide advantages, the approach also requires a substantial investment in frequency spectrum. The four sequential 1.25 MHz frequency bands, along with two 625 kHz guard bands, take up a total of 6.25 MHz of frequency spectrum, as illustrated in FIG. 1. This substantial usage of frequency spectrum may limit the applicability of the hybrid frequency reuse approach.

Accordingly, there is a need for methods and system that support hybrid frequency reuse in a more spectrally efficient manner.

SUMMARY

In a first principal aspect, an exemplary embodiment of the present invention provides a method of frequency usage in a wireless telecommunications network having a plurality of wireless coverage areas. In accordance with the method, a first frequency band is allocated for spread spectrum wireless communication with mobile stations operating in a first wireless coverage area, and a second frequency band is allocated for spread spectrum wireless communication with mobile stations operating in a second wireless coverage area. The second frequency band overlaps in frequency with a portion of the first frequency band.

In a second principal aspect, an exemplary embodiment of the present invention provides a base station comprising a first antenna system defining a first sector, a second antenna system defining a second sector, a third antenna system defining a third sector, and a transceiver system communicatively coupled to the first, second, and third antenna systems. The transceiver system is configured for spread spectrum communications through the first antenna system using a first frequency band, through the second antenna system using a second frequency band, and through the third antenna system using a third frequency band.

In a third principal aspect, an exemplary embodiment of the present invention provides a method of frequency usage for a plurality of cells of a wireless telecommunications network, wherein each of the cells includes an alpha sector, a beta sector, and a gamma sector. In accordance with the method, a first frequency assignment is provided for alpha sectors, wherein the first frequency assignment includes a first frequency band a second frequency band. A second frequency assignment is provided for beta sectors, wherein the second frequency assignment includes the first frequency band and a third frequency band. A third frequency assignment is provided for gamma sectors, wherein the third frequency assignment includes the first frequency band and a fourth frequency band. The second and third frequency bands partially overlap in frequency. The third and fourth frequency bands partially overlap in frequency. However, the first frequency band does not overlap in frequency with any of the second, third, and fourth frequency bands.

DETAILED DESCRIPTION OF EXEMPLARY EMBODIMENTS

1. Overview

It has been found that using frequency bands for spread spectrum wireless communication, wherein the frequency bands partially overlap in frequency, can provide advantages. For example, the overlapping frequency bands can take up less frequency spectrum, thereby facilitating a more spectrally efficient hybrid frequency reuse plan.

The overlapping frequency bands might be used only for downlink communications. Alternatively, one set of overlapping frequency bands might be used for uplink communications and another set of overlapping frequency bands may be used for downlink communications. The extent of the overlap could range from just over 0% to about 50%, with only a modest reduction in data rate and throughput. For example, two frequency bands might have a 50% frequency overlap such that half of the bandwidth of each of the two frequency bands occupies the same frequency range. Thus, for two frequency bands, each with a bandwidth of approximately 1.25 MHz, the center frequencies of the two frequency bands may differ by approximately 0.625 MHz.

Frequency bands that partially overlap in frequency may be deployed in a hybrid frequency reuse plan. For example, in a K=1/K=3 hybrid frequency reuse plan, the sector-specific (K=3) frequency bands may partially overlap in frequency, while the frequency band used throughout (K=1) may overlap with the other frequency bands. In the case of 50% frequency overlap for the K=3 frequency bands, the K=1/K=3 hybrid frequency reuse plan may take up only 5 MHz of frequency spectrum, as compared to 6.25 MHz for a conventional K=1/K=3 hybrid frequency reuse plan.

2. Exemplary Frequency Usage

Figure 3:
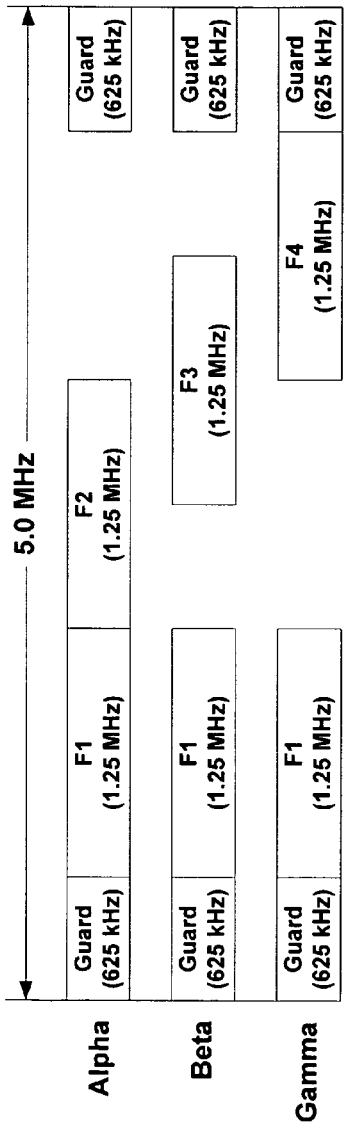
FIG. 3 is a schematic diagram illustrating a frequency spectrum used in a K=1/K=3 hybrid frequency reuse plan, in accordance with an exemplary embodiment of the present invention.
Figure 4:
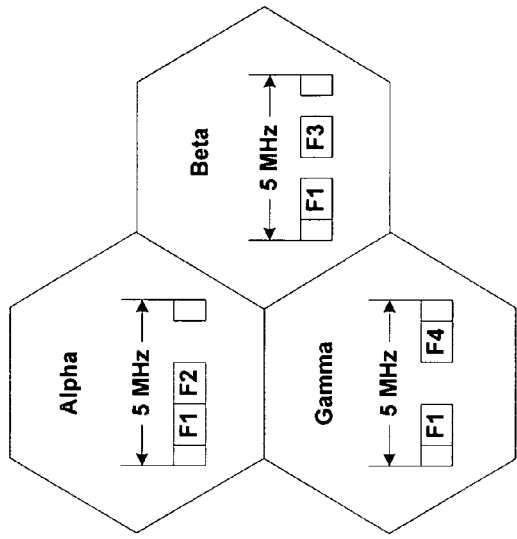
FIG. 4 is a schematic diagram illustrating frequency assignments in a cell site, in accordance with an exemplary embodiment of the present invention.

FIGS. 3 and 4 illustrate an exemplary approach for using overlapping frequency bands in a K=1/K=3 hybrid frequency reuse plan. As shown in FIG. 3, four 1.25 MHz frequency bands are used, designated F1, F2, F3, and F4. These frequency bands may be used for spread spectrum communications with mobile stations. For example, in accordance with Revision B of EVDO, various channels defined by different codes and/or time slots may be used for communication within each frequency band. It is to be understood that the frequency bands could be either downlink frequency bands (for downlink communications) or uplink frequency bands (for uplink communications).

The F1 frequency band is used in all sectors. However, the F2 frequency band is used only in alpha sectors, the F3 frequency band is used only in beta sectors, and the F4 frequency band is used only in gamma sectors. In this way, each alpha sector has a frequency assignment including F1 and F2, each beta sector has a frequency assignment including F1 and F3, and each gamma sector has a frequency assignment including F1 and F4. In a given sector, the two frequency bands may be concatenated together for downlink communications (in the case that the two frequency bands are downlink bands) or for uplink communications (in the case that the two frequency bands are uplink bands).

As illustrated in FIG. 3, the F2 frequency band may overlap in frequency with a portion of the F3 frequency band, and the F3 frequency band may overlap in frequency with a portion of the F4 frequency band. In an exemplary embodiment, the center frequencies (e.g., the carrier frequencies) in each of the F2, F3, and F4 frequency bands are offset from each other by 0.625 MHz so that the extent of the frequency overlap is 50%. The F1 frequency band, however, does not overlap with any of the F2, F3, and F4 frequency bands. As a result, with the addition of two 625 kHz guard bands, the total amount of frequency spectrum that is used in the FIG. 3 embodiment is 5.0 MHz.

FIG. 4 illustrates schematically how a cell may be divided into an alpha sector, a beta sector, and a gamma sector. This arrangement of sectors may be repeated in other cells such that (i) each alpha sector borders only beta and gamma sectors of adjacent cells, (ii) each beta sector borders only alpha and gamma sectors of adjacent cells, and (iii) each gamma sector borders alpha and beta sectors of adjacent cells.

Figure 1:
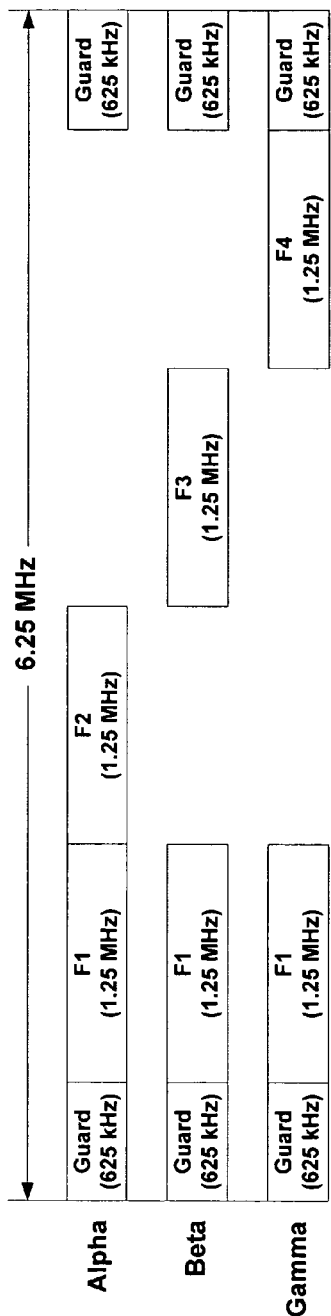
FIG. 1 is a schematic diagram illustrating a frequency spectrum used in a conventional K=1/K=3 hybrid frequency reuse plan.
Figure 2:
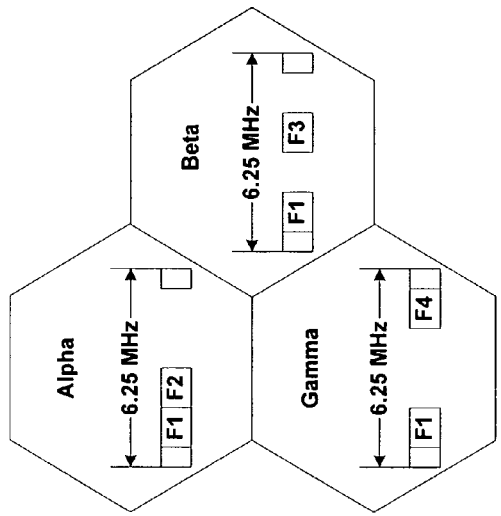
FIG. 2 is a schematic diagram illustrating frequency assignments in a cell site, in accordance with a conventional K=1/K=3 hybrid frequency reuse plan.

Table 1 summarizes data rates and throughputs that have been calculated (based on computer simulations) for different frequency reuse plans in Revision B of EVDO. Specifically, Table 1 compares results that have been calculated for a K=1 plan (in which the same three non-overlapping frequency bands are re-used in every sector), for a K=1/K=3 plan with a 1.25 MHz spacing between center frequencies (as illustrated in FIG. 1), and for a K=1/K=3 plan with a 625 kHz spacing between the center frequencies of the overlapping frequency bands (as illustrated in FIG. 3).

TABLE 1

| Data rate (DR) and throughput (TP) n kbps | | K = 1 | K = 1/K = 3 1.25 MHz spacing | K = 1/K = 3 625 kHz spacing |
| --- | --- | --- | --- | --- |
| Downlink | Peak DR | 9300 | 6200 | 6200 |
| | Avg. User DR | 1800 | 2500 | 2300 |
| | Sector TP | 3300 | 4700 | 4200 |
| | Edge of Cell DR | 300 | 1800 | 1200 |
| Uplink | Peak DR | 5400 | 5400 | 5400 |
| | Avg. User DR | 900 | 900 | 900 |
| | Sector TP | 1800 | 1800 | 1800 |
| | Edge of Cell DR | 240 | 240 | 240 |

The results in Table 1 indicate that using overlapping frequency bands in a K=1/K=3 hybrid frequency reuse plan may lead to only a modest reduction in data rate and throughput as compared to a conventional, non-overlapping K=1/K=3 hybrid frequency reuse plan. In addition, a K=1/K=3 hybrid frequency reuse plan with overlapping frequency bands may still provide advantages with respect to increased average user data rate, sector throughput, and edge of cell data rate as compared to the K=1 approach. Moreover, a K=1/K=3 hybrid frequency reuse plan with overlapping frequency bands may provide these advantages in a more spectrally efficient manner, e.g., using only 5.0 MHz of frequency spectrum as compared to the 6.25 MHz that would be used in a conventional K=1/K=3 hybrid frequency reuse plan.

3. Exemplary Base Station

Figure 5:
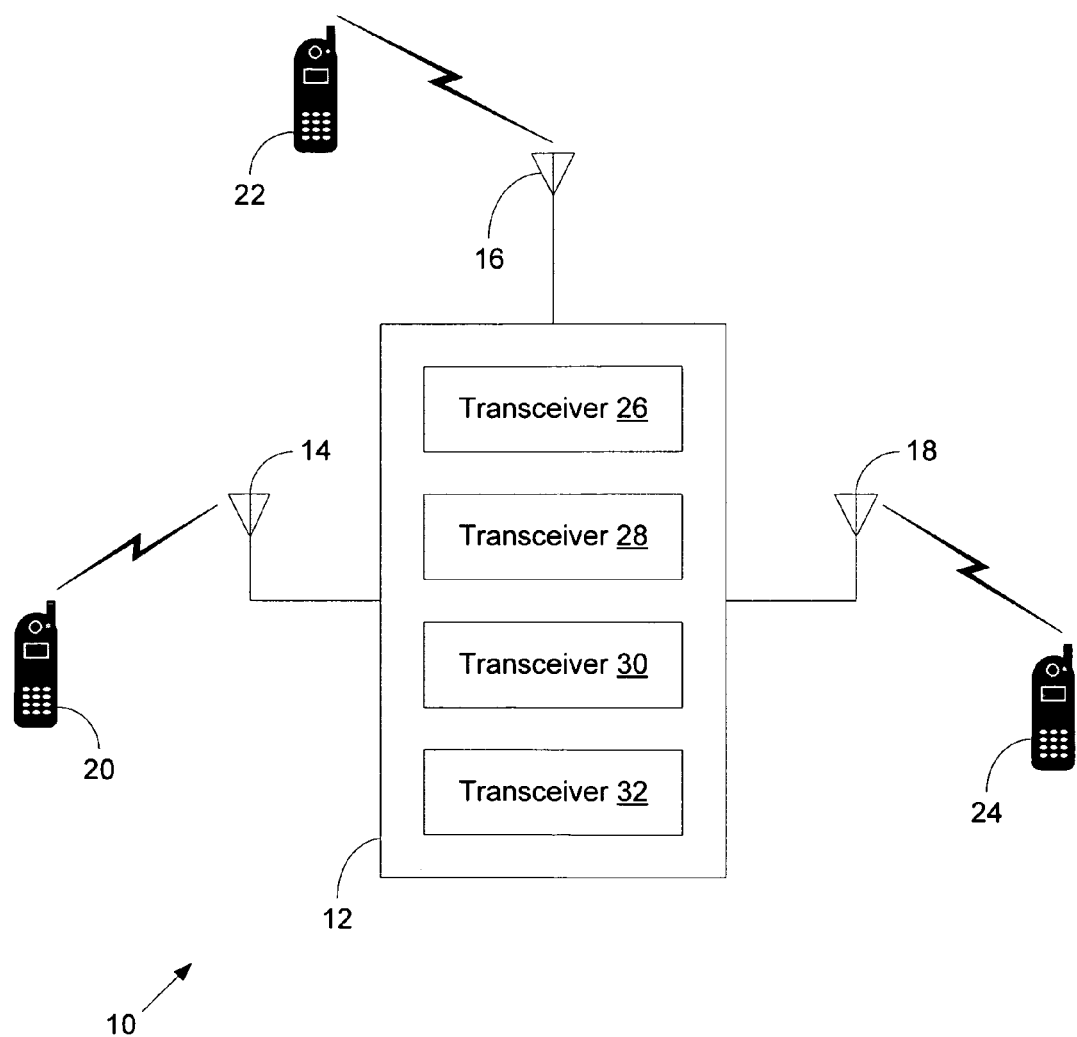
FIG. 5 is a block diagram of a base station, in accordance with an exemplary embodiment of the present invention.

FIG. 5 illustrates an exemplary base station 10 that may be used to provide the wireless coverage illustrated in FIG. 4. Base station 10 may include a transceiver system 12 that is communicatively coupled to a first antenna system 14, a second antenna system 16, and a third antenna system 18. Antenna systems 14, 16, and 18 may each include one or more directional transmitting antennas and one or more directional receiving antennas so as to define a particular sector within which the antenna system may wirelessly communicate with one or more mobile stations. Antenna systems 14, 16, and 18 could be mounted on the same antenna tower. Alternatively, antenna systems 14, 16, and 18 could be mounted on different structures.

In an exemplary embodiment, antenna systems 14, 16, and 18 respectively define the alpha, beta, and gamma sectors shown in FIG. 4. Thus, antenna system 14 may wirelessly communicate with mobile stations, such as mobile station 20, operating in the alpha sector. Antenna system 16 may wirelessly communication with mobile stations, such as mobile station 22, operating in the beta sector. Antenna system 18 may wirelessly communicate with mobile stations, such as mobile station 24, operating in the gamma sector.

Transceiver system 12 may include a plurality of transceivers, e.g., transceivers 26, 28, 30, and 32, for transmitting and receiving signals in a plurality of different frequency bands. The frequency bands may, for example, correspond to frequency bands F1, F2, F3, and F4 as illustrated in FIG. 3. Each of transceivers 26-32 may be coupled to one or more of antenna systems 14-18, depending on the frequency assignments of the alpha, beta, and gamma sectors. Thus, for the frequency assignments illustrated in FIGS. 3 and 4, transceiver 26 may communicate through all of the antenna systems using the F1 frequency band. However, transceiver 28 may communicate through only antenna system 14 using the F2 frequency band, transceiver 30 may communicate through only antenna system 16 using the F3 frequency band, and transceiver 32 may communicate through only antenna system 18 using the F4 frequency band.

Moreover, multiple transceivers in transceiver system 12 may operate together through an antenna system to allow frequency bands to be concatenated together. For example, transceivers 26 and 28 may communicate with mobile station 20, through antenna system 14, using spread spectrum traffic channels in F1 and F2. At the same time, transceivers 26 and 30 may communicate with mobile station 22, through antenna system 16, using spread spectrum traffic channels in F1 and F3, and transceivers 26 and 32 may communicate with mobile station 24, through antenna system 18, using spread spectrum traffic channels in F1 and F4.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of frequency usage in a wireless telecommunications network having a plurality of wireless coverage areas, said method comprising:
   allocating a first frequency band in said wireless telecommunications network for spread spectrum wireless communication with mobile stations operating in a first wireless coverage area;
   allocating a second frequency band in said wireless telecommunications network for spread spectrum wireless communication with mobile stations operating in a second wireless coverage area, wherein said second frequency band overlaps in frequency with a portion of said first frequency band; and
   allocating a third frequency band in said wireless telecommunications network for spread spectrum wireless communication with mobile stations operating in said first and second wireless coverage areas, wherein said third frequency band does not overlap in frequency with any of said first and second frequency bands.

2. The method of claim 1, wherein said first frequency band includes a first downlink band and said second frequency band includes a second downlink band.

3. The method of claim 2, wherein said first frequency band further includes a first uplink band and said second frequency band further includes a second uplink band.

4. The method of claim 2, wherein said first downlink band includes a first spread spectrum traffic channel and said second downlink band includes a second spread spectrum traffic channel.

5. The method of claim 4, further comprising:
   said wireless telecommunications network communicating with a first mobile station operating in said first wireless coverage area using said first spread spectrum traffic channel while communicating with a second mobile station operating in said second wireless coverage area using said second spread spectrum traffic channel.

6. The method of claim 4, wherein said first and second spread spectrum traffic channels are Evolution Data Optimized (EVDO) traffic channels.

7. The method of claim 4, wherein
said third frequency band includes a third downlink band.

8. The method of claim 7, further comprising:
said wireless telecommunications network communicating with a first mobile station operating in said first wireless coverage area using said first spread spectrum traffic channel concatenated with a first additional spread spectrum traffic channel in said third downlink band while communicating with a second mobile station operating in said second wireless coverage area using said second spread spectrum traffic channel concatenated with a second additional spread spectrum traffic channel in said third downlink frequency band.

9. The method of claim 1, wherein said first frequency band has a first center frequency and a bandwidth and said second frequency band has a second center frequency and said bandwidth, wherein said second center frequency is offset from said first center frequency by approximately half of said bandwidth.

10. The method of claim 9, wherein said bandwidth is approximately 1.25 MHz.

11. The method of claim 1, wherein said first wireless coverage area is adjacent to said second wireless coverage area.

12. The method of claim 1, wherein said first wireless coverage area is a first sector in a cell defined by a base station and second wireless coverage area is a second sector in said cell defined by said base station.

13. A base station, comprising:
a first antenna system defining a first sector;
a second antenna system defining a second sector;
a third antenna system defining a third sector; and
a transceiver system communicatively coupled to said first, second, and third antenna systems, wherein said transceiver system is configured for spread spectrum communications (i) through said first antenna system using a first frequency band, (ii) through said second antenna system using a second frequency band, (iii) through said third antenna system using a third frequency band, and (iv) through said first, second, and third antenna systems using a fourth frequency band,
wherein said first and second frequency bands partially overlap in frequency, said second and third frequency bands partially overlap in frequency, and said fourth frequency band does not overlap in frequency with any of said first, second, and third frequency bands.

14. The base station of claim 13, wherein said first, second, and third frequency bands each have a bandwidth of approximately 1.25 MHz.

15. The base station of claim 14, wherein said first frequency band has a first center frequency, said second frequency band has a second center frequency, and said third frequency band has a third center frequency, and wherein said first and second center frequencies differ by at least 0.625 MHz and said second and third center frequencies differ by at least 0.625 MHz.

16. The base station of claim 15, wherein said fourth frequency band has a bandwidth of approximately 1.25 MHz and has a fourth center frequency that differs from said first center frequency by approximately 1.25 MHz.

17. A method of frequency usage for a plurality of cells of a wireless telecommunications network, wherein each of said cells includes an alpha sector, a beta sector, and a gamma sector, said method comprising:
said wireless telecommunications network using a first frequency assignment for spread spectrum communication in alpha sectors, wherein said first frequency assignment includes a first frequency band and a second frequency band;
said wireless telecommunications network using a second frequency assignment for spread spectrum communication in beta sectors, wherein said second frequency assignment includes said first frequency band and a third frequency band; and
said wireless telecommunications network using a third frequency assignment for spread spectrum communication in gamma sectors, wherein said third frequency assignment includes said first frequency band and a fourth frequency band,
wherein said second and third frequency bands partially overlap in frequency, said third and fourth frequency bands partially overlap in frequency, and said first frequency band does not overlap in frequency with any of said second, third and fourth frequency bands.

18. The method of claim 17, wherein said first, second, third, and fourth frequency bands include respective spread spectrum traffic channels.

19. The method of claim 18, wherein said spread spectrum channels are EVDO traffic channels.

* * * * *